US006511725B1

(12) United States Patent
Rawlings

(10) Patent No.: US 6,511,725 B1
(45) Date of Patent: Jan. 28, 2003

(54) STIPPLED LABEL SHEET

(75) Inventor: Timothy W. Rawlings, Waynesville, OH (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/359,029

(22) Filed: Jul. 22, 1999

(51) Int. Cl.[7] .......................... B32B 33/00; B42D 15/00

(52) U.S. Cl. .................... 428/40.1; 428/41.7; 428/41.8; 428/195; 428/198; 428/343; 283/81

(58) Field of Search ................................ 428/198, 195, 428/41.8, 40.1, 343; 283/81

(56) References Cited

U.S. PATENT DOCUMENTS

| | | | | | |
|---|---|---|---|---|---|
| 3,503,782 | A | | 3/1970 | Ayres | 428/40 |
| 4,097,943 | A | * | 7/1978 | O'Connell | 5/335 |
| 4,889,234 | A | * | 12/1989 | Sorensen et al. | 206/459 |
| 5,022,526 | A | * | 6/1991 | Crum | 206/459 |
| 5,061,535 | A | | 10/1991 | Kreckel et al. | 428/42 |
| 5,071,167 | A | * | 12/1991 | O'Brien | 283/79 |
| 5,284,689 | A | * | 2/1994 | Laurash et al. | 428/40 |
| 5,328,208 | A | | 7/1994 | Garrison | 283/105 |
| 5,482,753 | A | * | 1/1996 | Langan et al. | 428/42 |
| 5,580,640 | A | | 12/1996 | Kraft et al. | 428/195 |
| 5,591,290 | A | * | 1/1997 | Walter et al. | 156/152 |
| 5,593,395 | A | * | 1/1997 | Martz | 604/304 |
| 5,985,396 | A | * | 11/1999 | Kerins et al. | 428/41.8 |
| 6,110,554 | A | | 8/2000 | Moeller et al. | 428/41.8 |

FOREIGN PATENT DOCUMENTS

| | | |
|---|---|---|
| EP | 0577977 | 1/1994 |
| GB | 2211759 | 7/1989 |
| GB | 2315727 | 2/1998 |
| GB | 2319762 | 6/1998 |

OTHER PUBLICATIONS

Roth et al., U.S. patent application, Ser. No. 09/359,030, "Variegated Label Sheet", filed concurrently herewith (NCR Docket No. 8170).

Roth et al., U.S. patent application, Ser. No. 09/114,434; "Label Sheet", filed Jul. 13, 1998 (NCR Docket No. 8066).

Roth et al., U.S. patent application, Ser No. 09/151,000; "Selective Release Label Sheet", filed Sep. 10, 1998 (NCR Docket No. 8133).

Rhodia, Inc., "UV–Silicone Cure System", Mar. 9, 1998, 7 pages.

Wallace.com, "New Product Announcements", two page website printed May 1999.

* cited by examiner

*Primary Examiner*—Shrive P. Beck
*Assistant Examiner*—Elena Tsoy
(74) *Attorney, Agent, or Firm*—Francis L. Conte

(57) ABSTRACT

A label sheet includes a label removably laminated to a release liner by a stippled release bond therebetween.

19 Claims, 4 Drawing Sheets

STIPPLED LABEL SHEET

BACKGROUND OF THE INVENTION

The present invention relates generally to laminated label sheets, and, more specifically, to label integrity thereof.

Label sheets are commonly available in various configurations with and without printing thereon. A typical label sheet is a laminate of a paper overlay and an underlying release liner. An adhesive bonds the overlay to the liner in the finished article.

In typical use, information is printed atop the overlay, and the overlay is then removed from the liner by being peeled therefrom. The peeled away label has exposed adhesive so that it may be pressed against paper or other object for permanent attachment thereto. A typical release liner is coated over one side with liquid silicone which is thermally cured for providing a low adhesion surface thereatop to which the overlay is temporarily bonded. The adhesive forms a weak bond between the overlay and the silicone liner which sufficiently maintains together the laminate until it is desired to remove the overlay from the liner.

More complex label sheets include several labels or decals in the overlay defined by respective perimeter diecuts therebetween which allow removal of individual labels from the liner. The individual labels may be directly adjacent to each other or there may be an intervening label rim or border which remains attached to the liner after the individual labels are peeled away.

The label sheets may be provided end-to-end in series roll form, or may be stacked in groups of individual sheets. These various label sheets nevertheless use a commonly fabricated release liner which is typically manufactured in large rolls with the silicone in liquid form being applied over the entire surface of the liner material which is then thermally cured. The label face sheet is laminated to the liner using a full surface adhesive therebetween. The large roll of laminated labels is then cut into individual smaller rolls for use in various label sheet applications as required.

The release coating may be specifically formulated to effect low to high release bonds with the adhesive backing the overlay. In use, it is desired to have low release bonds so that the individual labels may be easily removed. This is typically accomplished by bending the label sheet near one of the diecuts to locally break the bond thereat and expose a portion of the label which is then peeled away.

However, if the release bond is too weak, individual labels may separate from the liner during their travel through a printer. A printer may include narrow rollers for guiding the label sheet therethrough. The narrow rollers bend the sheet tightly which may separate the labels from the liner if insufficient release bonds are used. If a label predispenses in the printer, it not only destroys the usefulness of the label, but can damage the printer by bonding to internal components thereof.

Accordingly, the release bond is typically tailored for a specific type of label sheet and intended printer, and should be suitably high or strong to prevent predispensing in the printer. This correspondingly high release bond increases the difficulty of removing individual labels when desired in use. This can be a significant problem where labels are used in large volume, such as in the pharmacy industry.

Pharmacists typically use a label sheet integrated with a form for recording various information in a typical pharmaceutical drug transaction which requires one or more individual labels to be removed from the sheet and attached to a prescription drug container. The use of high release bonds in a label sheet to prevent predispensing in a laser printer correspondingly increases the difficulty of removing individual labels from the sheet, and therefore increases the amount of work and time required in completing individual drug transactions.

Accordingly, it is desired to provide an improved label sheet which increases the ease of removing individual labels during use, yet prevents predispensing thereof.

BRIEF SUMMARY OF THE INVENTION

A label sheet includes a label removably laminated to a release liner by a stippled release bond therebetween.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
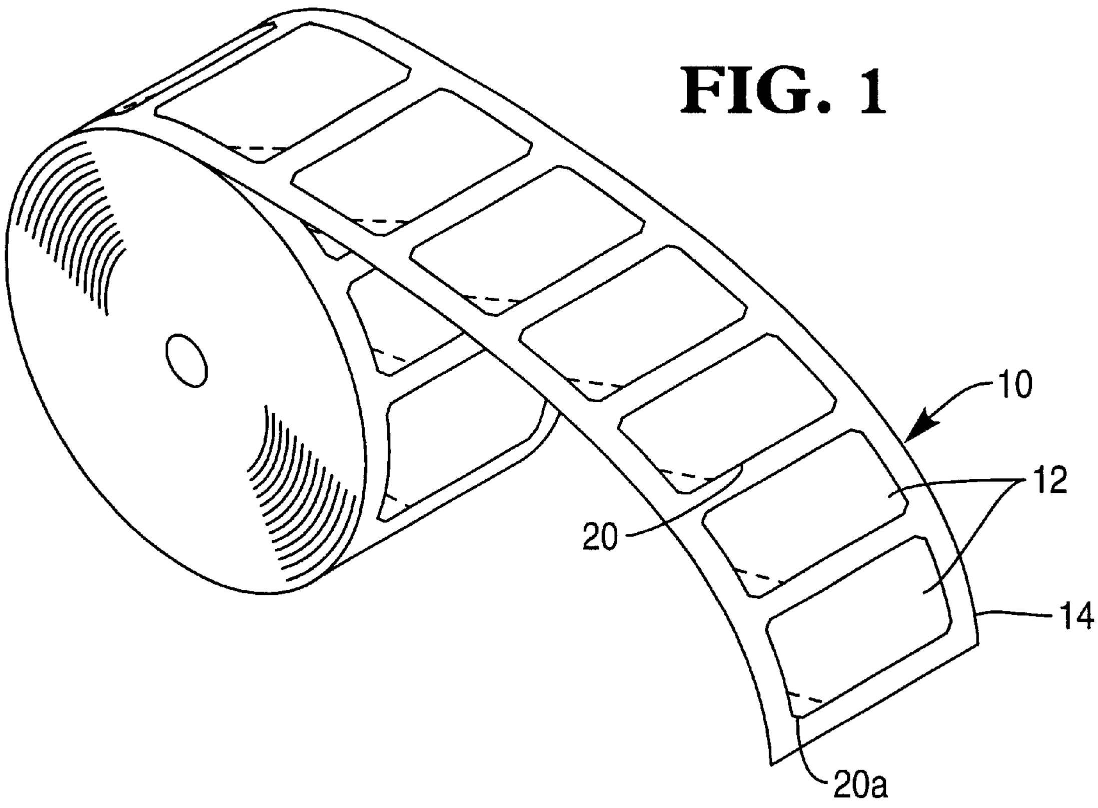
FIG. 1 is an isometric view of a label sheet in roll form in accordance with an exemplary embodiment of the present invention.

Illustrated in FIG. 1 is a label sheet or laminate 10 in accordance with an exemplary embodiment of the present invention in roll form. The sheet includes a row of labels 12 removably bonded to an underlying release liner 14. The labels and liner may have any conventional configuration and composition, and may be configured in individual sheets, or roll form as illustrated in any conventional manner.

In an exemplary embodiment, multiple labels 12 are bonded to a common release liner in a string for automated printing and application. The roll of labels may be used with a conventional thermal transfer printer or direct thermal printer for printing any desired information atop the labels in sequence, with the individual labels being subsequently removed from the liner for re-affixing atop a suitable article or object with a permanent bond thereatop.

Figure 2:
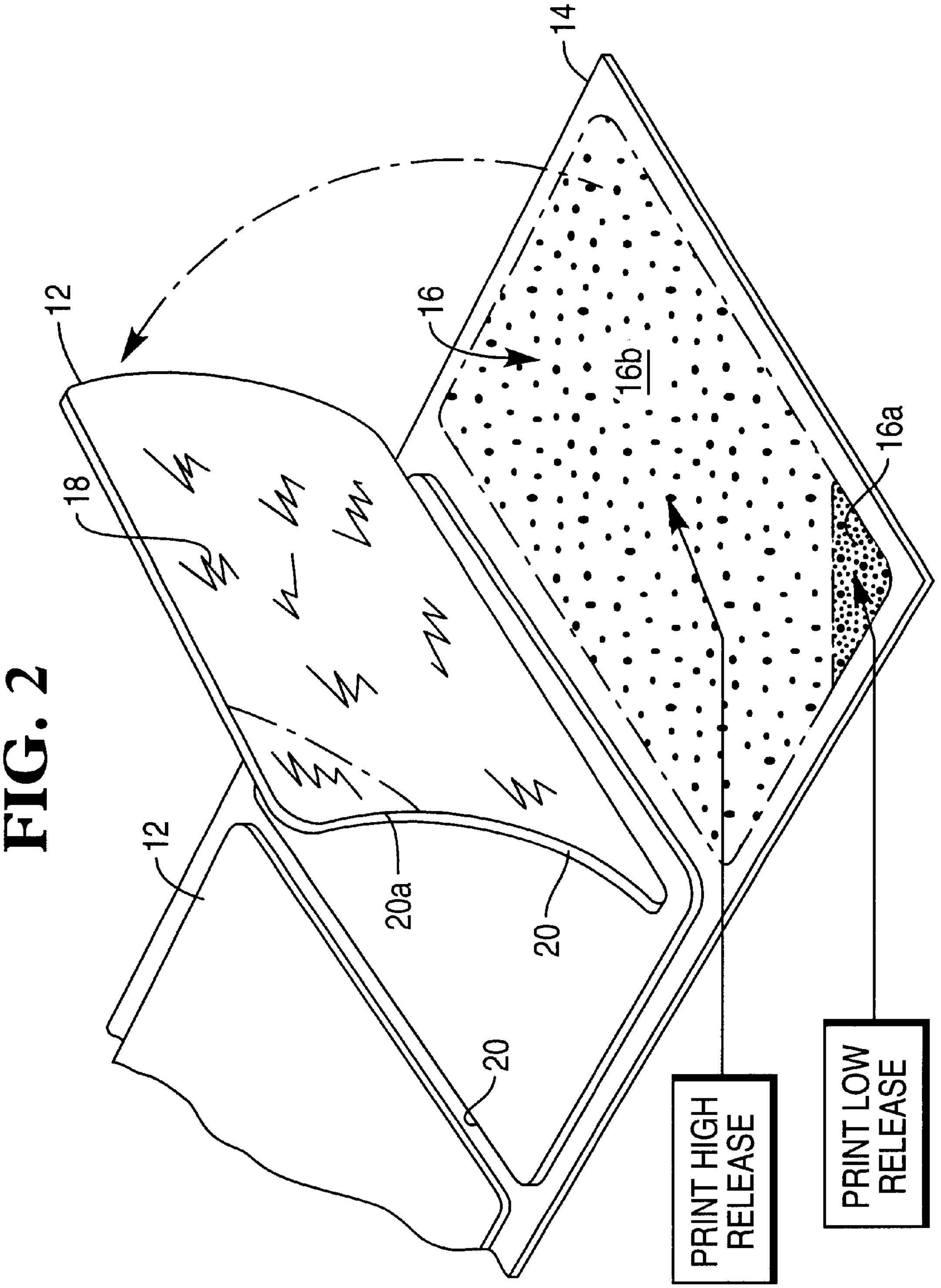
FIG. 2 is an exploded isometric view of a portion of the label sheet illustrated in FIG. 1 with a label being removed from an underlying release liner illustrating a stippled release bond therebetween.

FIG. 2 illustrates in more detail an exemplary embodiment of the present invention for improving the removability of the individual labels 12 from the liner 14 while maintaining predispensing resistance. More specifically, the individual labels 12 are joined to the liner 14 with a selectively varying release bond therebetween for effecting a tight bond over the majority of the liner, with a local portion thereof having a low release bond permitting easy separation thereat.

Each label 12 includes a front for receiving printing thereatop, and an opposite back. The liner 14 includes a front upon which the label is disposed, and an opposite back. A release 16 is disposed atop the front of the liner and may have any conventional composition. For example, the release 16 may be in the form of a cured liquid silicone which provides a low adhesion release agent coating the liner front. An adhesive 18 is disposed below the label 12 and coats its backside to form a release bond removably laminating the label to the liner.

In accordance with the present invention, at least one of the release 16 and adhesive 18 is stippled or formed as dots or small patches separated from each other. The stippled or speckled release bond formed by the cooperating release 16 and adhesive 18 may be tailored in strength by varying the stipple density in which bond strength varies due to the stipples and the uncoated interstices therebetween.

As shown in FIG. 2, each label includes a perimeter 20 which is typically formed by full perimeter die cuts in the overlay material forming the several labels. The stippled release bond varies in stipple density inboard from the perimeter to provide different bond strength therebetween.

A conventional label sheet includes full surface release coating on the liner and full surface adhesive on the label, with the release end adhesive being specifically tailored for obtaining a single desired bond strength therebetween. In contrast, at least one of the release 16 and adhesive 18 is stippled, although both could be stippled if desired. For example, FIG. 2 illustrates that only the release 16 is stippled, with the adhesive 18 being a continuous, non-stippled surface which coats the underside of the label 12 in any conventional manner. The tippled release 16 may therefore be used to control the resulting bond strength between the label and liner by selectively varying the stipple density.

Stipple density may be defined by the number of dots or patches of the release agent per nit surface area, with the interstices therebetween being devoid of release agent. A 100% release stipple density would be a full coverage release coating, which is conventional. However, using less than 100% release stipple density in accordance with an exemplary embodiment of the present invention permits tailoring of the release bond between the label and liner for any desired benefit.

For example, the release 16 preferably has a greater stipple density adjacent the label perimeter 20 than inboard therefrom. The higher the release density, the weaker the resulting release bond. Accordingly, a locally weak bond may be provided at any location along the label perimeter to increase the ease of initially peeling the label from the liner in an easy-release configuration. The lower stipple density of the release inboard from the perimeter provides a relatively high release bond for affixing the label to the liner until separation thereof is desired.

In the exemplary embodiment illustrated in FIG. 2, the label 12 is rectangular with its perimeter having four comers 20*a* which bridge respective portions of the perimeter 20. Correspondingly, the release 16 preferably has a greater stipple density in a matching stipple comer 16*a*, which is positioned below a corresponding comer 20*a* of the label, than inboard therefrom in the balance or the remainder 16*b* of the release corresponding with the configuration of the overlying label.

The release 16 may be suitably stippled atop the liner 14 using conventional printing equipment. Instead of using printing ink, a liquid release 16 such as ultraviolet (UV) curable liquid silicone may be printed atop the liner in any desired pattern and density, and then cured by ultraviolet light. The stipple density of the release may vary from 100's to 1000's of release dots per square centimeter with a corresponding density less than 100% surface coverage.

The low stipple density release 16*b* disposed atop the liner 14 below the majority of the label 12 provides a relatively tight or high release bond therebetween preventing premature delamination or predispensing. The relatively high stipple density in the release corner 16*a* effects a relatively weak or low release bond with the corresponding label comer 20*a* which permits easy separation therebetween to initiate peeling of the label from the liner at the comer.

The size of the label comer 20*a* and complementary underlying release comer 16*a* may be made as small as practical for ensuring a relatively high release bond over the majority of the label, with a low release bond solely at one of the label comers for initiating easy peeling. Once one of the label corners is lifted from the liner, the remainder of the label is relatively easily peeled away from the liner notwithstanding the relatively high strength bond between the remainder of the label and the liner.

In the exemplary embodiment illustrated in FIG. 2, the high stipple density release corner 16*a* has a single density value up to and including 100%, and the remaining liner release 16*b* also has a single, but different, stipple density less than 100%. In this way, only two stipple densities are provided in the release to effect correspondingly different low and high release bonds between the different portions of the label and liner.

Although FIG. 2 illustrates the placement of the high stipple density release 16*a* at one of the four comers corresponding with the label, the high stipple density may be provided wherever desired, such as along any one or more of the four edges of the release profile corresponding with the label as desired. Any edge, or portion thereof, of the liner may have a relatively low release bond to permit easy release thereat.

Figure 3:
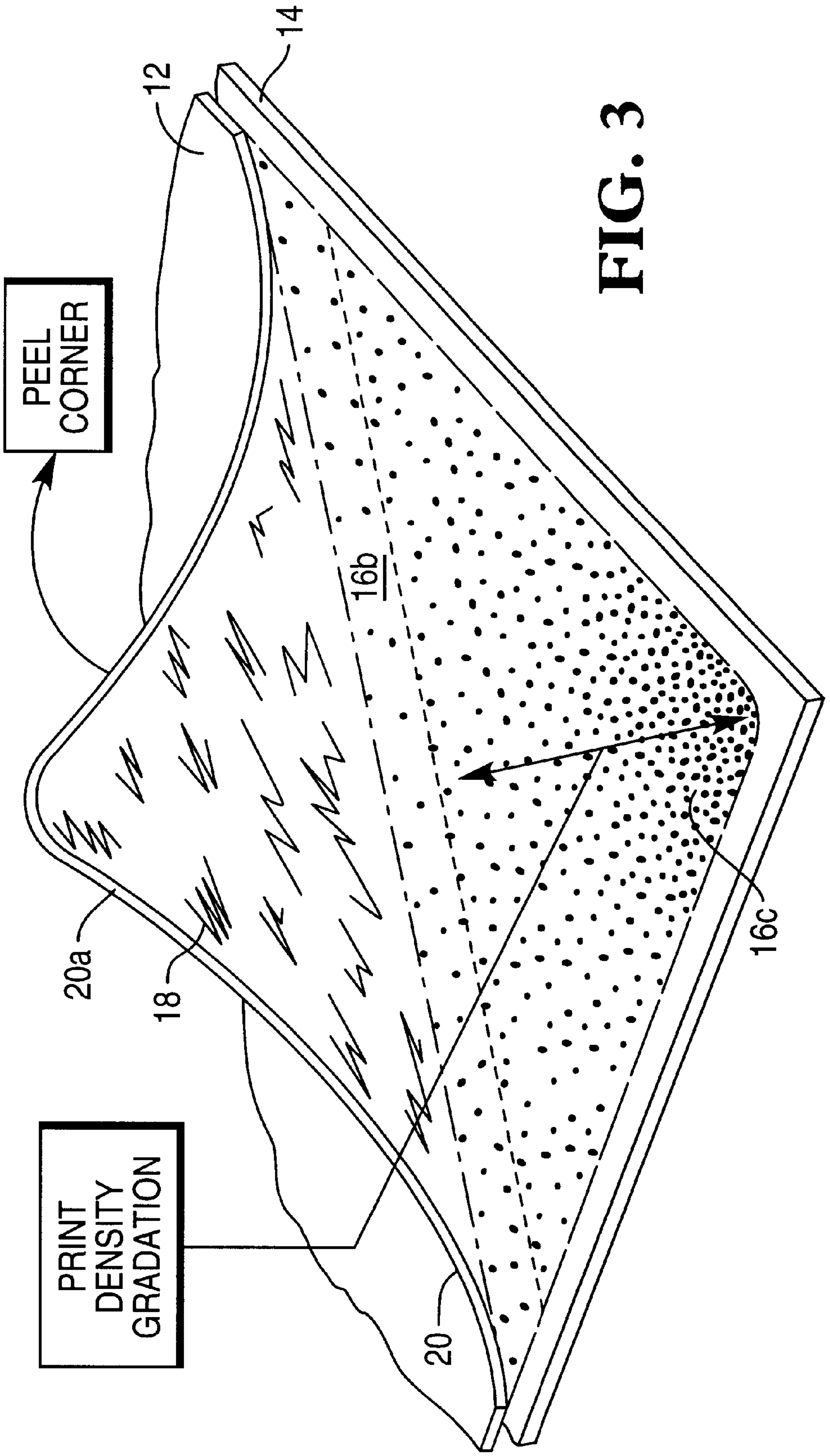
FIG. 3 is an enlarged isometric view of an exemplary comer of the label sheet having a release bond gradation therebetween in accordance with another embodiment of the present invention.

FIG. 3 illustrates an alternate embodiment of the invention wherein the release, designated 16*c*, below the label corner 20*a* has a stipple density gradation. The stipple density gradation preferably decreases in density from the perimeter 20 at the exemplary corner 20*a*inboard therefrom. The graduating release comer 16*c* has maximum stipple density at the corner apex and decreases in density along the mid-angle between the corner sides until it reaches the constant stipple density of the main release profile 16*b* below the majority of the label.

In this way, only the very tip end or apex of the label comer 20*a* has the lowest release bond, with the release bond increasing in strength gradually, such as linearly along a suitably short length of the label corner. The label 12 may thusly be peeled away from the liner using one of its corners with an imperceptible change in release bond strength. In this embodiment, the strength of the release bond may be maintained relatively high right up to one of the corners for preventing undesirable label predispensing, while permitting easy peel removal thereof.

In both embodiments illustrated in FIGS. 2 and 3, the label comer 20*a* below which is disposed the low release bond, is preferably arcuate around its apex, with a corresponding radius. The arcuate corner, instead of a 90° sharp corner, improves initial separation of the corner from the liner upon bending the label sheet thereat. The arcuate label corner is more readily separated from the liner in view of its shape, in conjunction with the low release bond therebelow.

Figure 4:
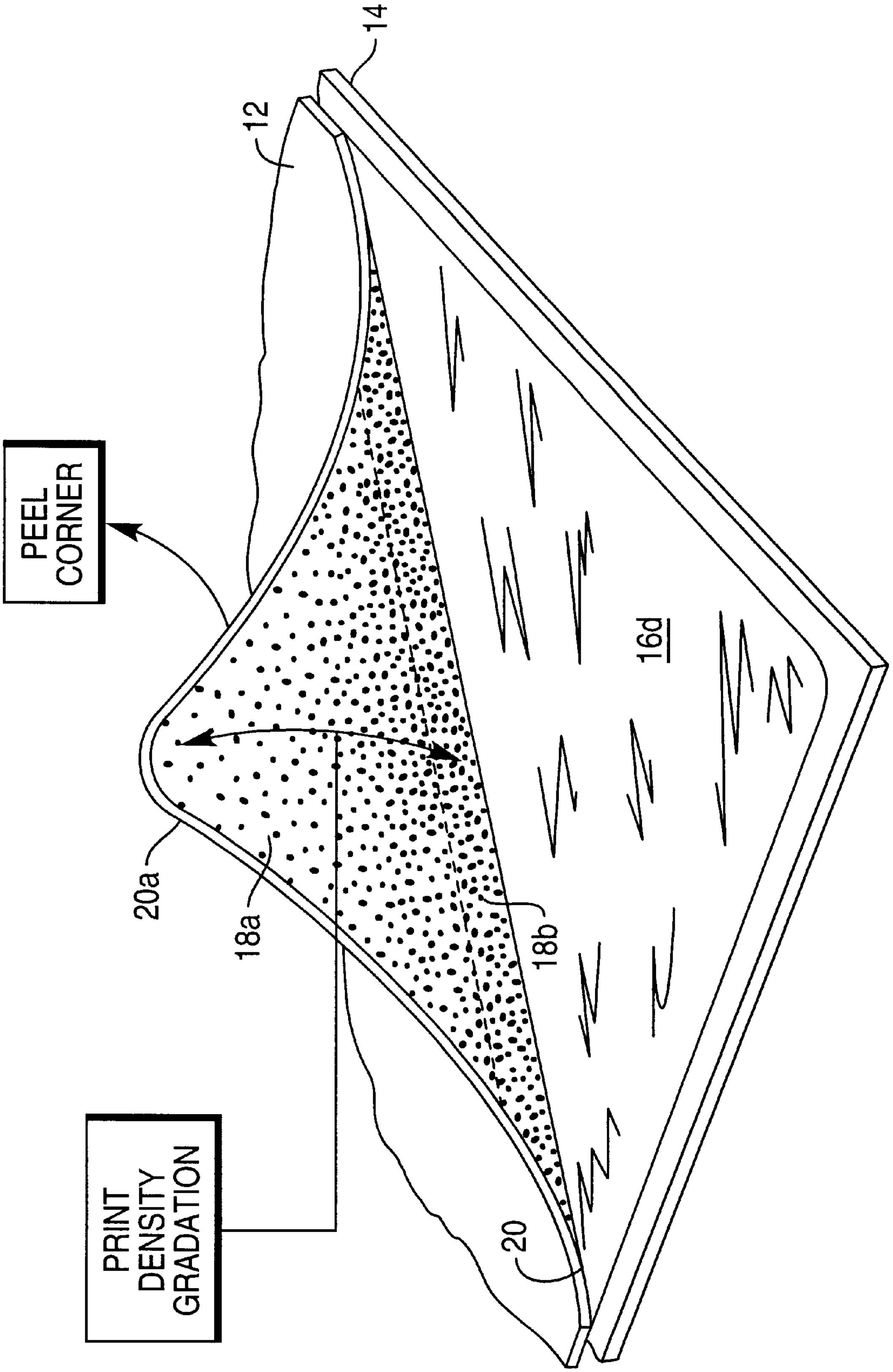
FIG. 4 is an enlarged isometric view of an exemplary comer of the label sheet having a release bond gradation therebetween in accordance with another embodiment of the present invention.

FIG. 4 illustrates an alternate embodiment of the present invention wherein the adhesive 18*a,b* is stippled or speckled instead of the release, designated 16*d*, which is continuous with a 100% density effected in any conventional manner. Instead of applying a continuous coating of adhesive to the backside of the label 12 with a 100% density, the adhesive has a stipple density at least in part less than 100%, which like the release illustrated in embodiments of FIGS. 2 and 3, may also be printed to the back of the liner in any stipple density or pattern as desired.

The release bond characteristics of the adhesive and release are mutually opposite. Accordingly, the adhesive 18*a* below the label corner 20*a* preferably has a lower stipple density adjacent the perimeter edges defining that corner than inboard therefrom.

The adhesive may be applied to the back of the label using only two stipple densities thereof corresponding with the opposite of the release densities illustrated in FIG. 2. However, in the exemplary FIG. 4 embodiment, the adhesive 18*a,b* has a stipple density gradation below the label corner 20*a* inboard from the perimeter thereof in a manner similar to, but opposite from, the release gradation illustrated in FIG. 3.

In FIG. 4, the adhesive stipple density below the label corner 20*a* at the apex thereof has a relatively low density and increases in density along the mid-angle of the corner until reaching the preferably constant stipple density of the adhesive 18*b* under the majority of the label. The adhesive stipple density may increase along the label corner up to 100% density over the remainder of the label to permit easy peeling of the corner in initiating delamination thereof when desired.

In the various embodiments disclosed above, either the release, or the adhesive, or both, may be stippled to provide densities thereof less than one hundred percent for tailoring the corresponding release bonds between the label and liner. In FIGS. 2 and 3, the release may have a density up to and including 100% at the perimeter of the label and decreasing in magnitude inboard therefrom for promoting easy peeling at any suitable location around the perimeter of the label. Similarly, the adhesive illustrated in FIG. 4 may have a stipple density suitably less than 100% at any location around the perimeter of the label, with the adhesive stipple density increasing all the way to 100%, if desired, inboard from the perimeter.

Improved peeling of the label 12 illustrated in FIG. 4 may also be obtained by using the arcuate corner 20*a* in the same manner as disclosed above with respect to the FIG. 3 embodiment.

The ability to stipple either the release or the adhesive in the various embodiments disclosed above permits tailoring of the release bond between the label and liner for any suitable purpose. For example, either an edge or corner of the label may be provided with a stippled low release bond to permit easy initiation of the peeling removal of the label from the liner. The low release bond for this objective is preferably localized at any one region of the perimeter of the label, with the label having a suitable notice printed thereon identifying the preferred peel The ability to stipple the release or adhesive provides an additional design parameter for increasing or decreasing release bonds. Decreasing release stipple density with full coverage adhesive correspondingly increases the release bond strength between the label and liner due to the adhesive bonds between the label and the interstices between the release stipples. Correspondingly, stippling the adhesive in combination with full coverage release decreases the release bond strength between the label and liner since less adhesive surface area is provided therebetween.

Accordingly, stippling of the release, or adhesive, or both, may be used to control the bond strength between the label and liner. Label edges may have low strength bonds with the liner or high strength bonds with the liner as desired. Instead of an easy peel label configuration, the entire perimeter of a label may have a relatively high strength bond with the liner, with the majority of the liner having a relatively low strength bond for preventing premature delamination of the label in various applications. These and other advantages using stippled release bonds may be obtained using various forms of the present invention.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims.

What is claimed is:

1. A label sheet comprising a label removably laminated to a release liner by a stippled release bond and having a label perimeter, and said bond comprises:

a release disposed atop said liner;

an adhesive disposed below said label; and said release is stippled, with uncoated interstices between release dot stipples on said liner, and said bond varies in stipple density inboard from said label perimeter to effect different stippled bond strengths at said perimeter and under a majority remainder of said label.

2. A label sheet comprising a label removably laminated to a release liner by a stippled release bond and having a label perimeter, and said bond comprises:

a release disposed atop said liner;

an adhesive disposed below said label; and both said release and adhesive are stippled, with uncoated interstices between dot stipples thereof, and said bond varies in stipple density inboard from said label perimeter to effect different stippled bond strengths at said perimeter and under a majority remainder of said label.

3. A label sheet according to claim 1 wherein said adhesive is a continuous surface.

4. A label sheet according to claim 1 wherein id label includes a corner, and said stipple density varies along a mid-angle between sides of said corner.

5. A label sheet according to claim 1 wherein said release has a greater stipple density adjacent said perimeter than inboard therefrom.

6. A label sheet according to claim 5 wherein said release has a stipple density gradation inboard from said perimeter.

7. A label sheet according to claim 1 wherein:

said label perimeter includes a corner; and said release has a greater stipple density below said corner than inboard therefrom.

8. A label sheet according to claim 7 wherein said release below said corner has a stipple density gradation.

9. A label sheet according to claim 7 wherein said corner is arcuate.

10. A label sheet according to claim 2 wherein said adhesive has a lower stipple density adjacent said perimeter than inboard therefrom.

11. A label sheet according to claim 10 wherein said adhesive has a stipple density gradation inboard from said perimeter.

12. A label sheet according to claim 2 wherein:

said label perimeter includes a corner; and said adhesive has a lower stipple density below said corner than inboard therefrom.

13. A label sheet according to claim 12 wherein said adhesive below said corner has a stipple density gradation.

14. A label sheet according to claim 12 wherein said corner is arcuate.

15. A label sheet according to claim 2 wherein said label includes a corner having a single stipple density thereunder, and the remainder of said label has a single, but different stipple density thereunder.

16. A label sheet according to claim 2 wherein said stipple density varies gradually from said perimeter.

17. A label sheet according to claim 2 wherein said label includes a corner, and said stipple density varies along a mid-angle between sides of said corner.

18. A label sheet according to claim 2 wherein said label includes a corner having a stipple density gradation, and the remainder of said label has a constant stipple density.

19. A label sheet according to claim 2 wherein said stipple density varies from 100's to 1000's of stipple dots per square centimeter.

* * * * *

UNITED STATES PATENT AND TRADEMARK OFFICE

CERTIFICATE OF CORRECTION

PATENT NO. : 6,511,725 B1

DATED : January 28, 2003

INVENTOR(S) : Rawlings, T. W.

It is certified that error appears in the above-identified patent and that said Letters Patent is hereby corrected as shown below:

Column 6,

Line 45, delete "id" and insert -- said --

Signed and Sealed this

First Day of July, 2003

JAMES E. ROGAN

*Director of the United States Patent and Trademark Office*